INVENTORS.
ROBERT P. HARBAGE.
EUGENE J. HAUPT.
BY
ATTORNEYS.

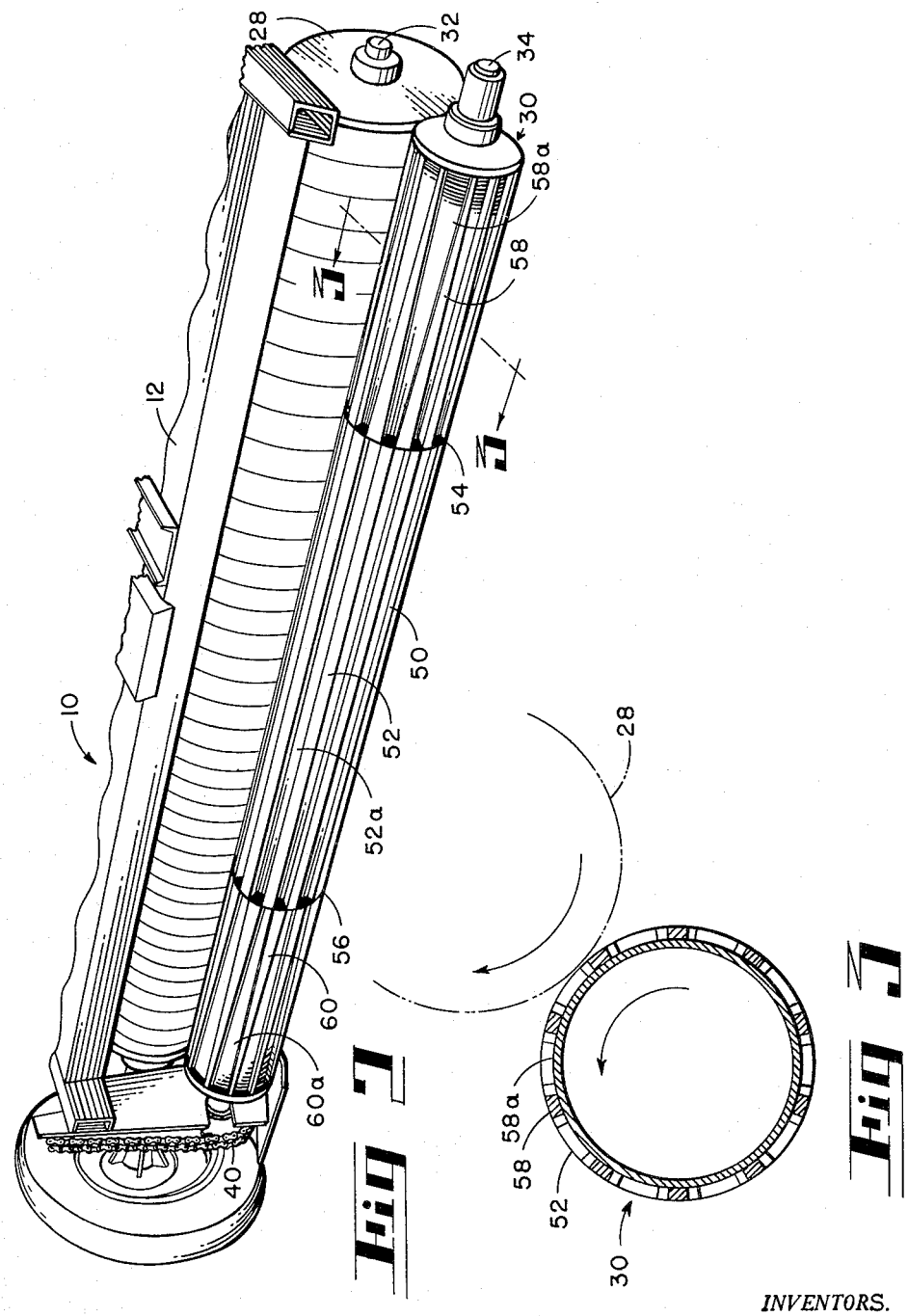

Aug. 29, 1961        R. P. HARBAGE ET AL        2,997,834
HAY CONDITIONER
Filed March 30, 1959        3 Sheets-Sheet 3
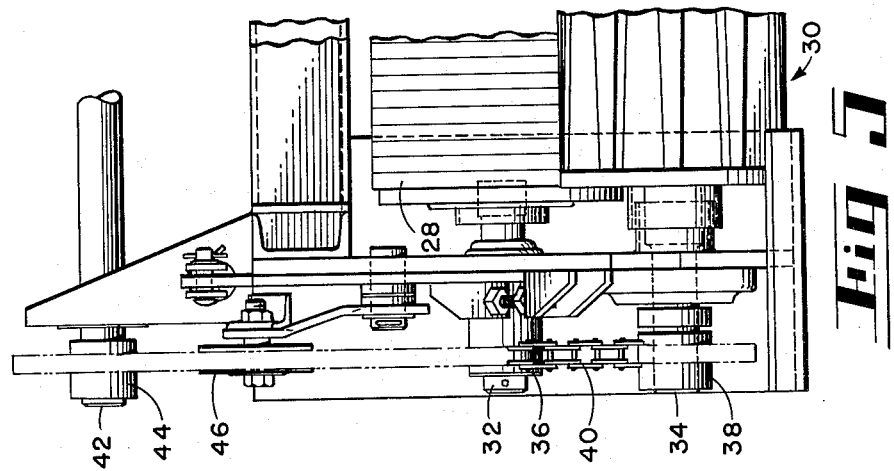
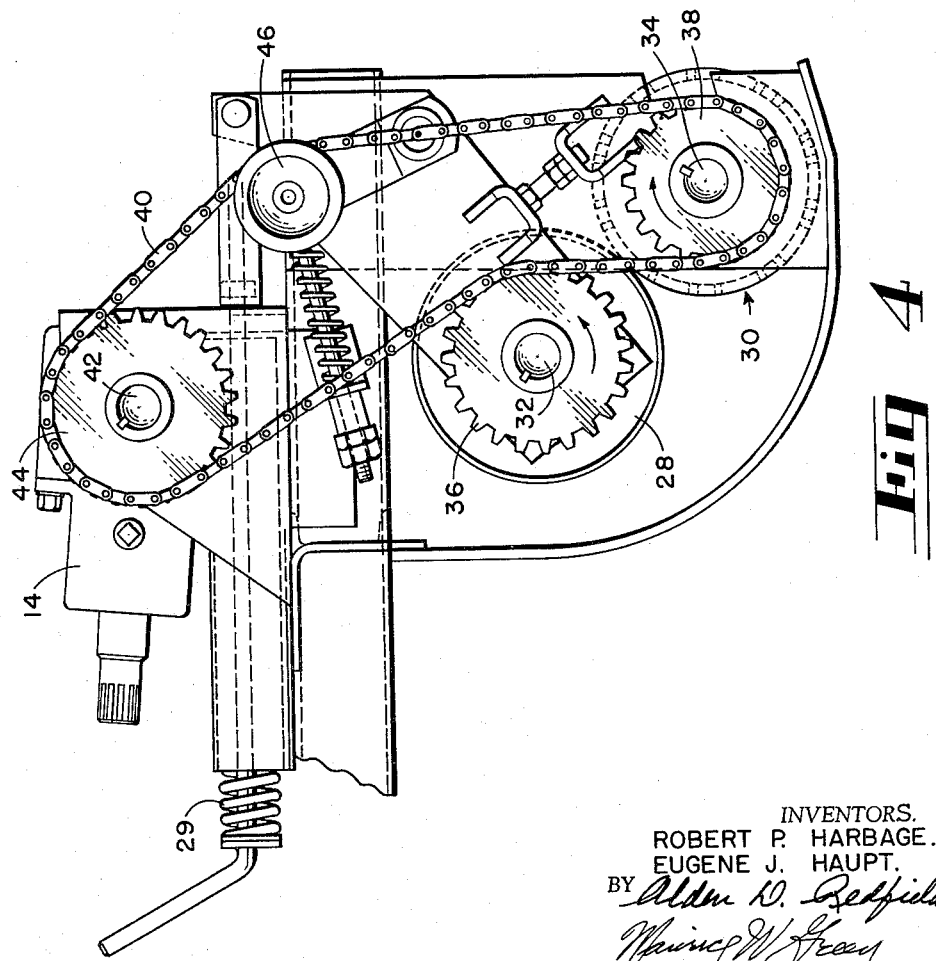
INVENTORS.
ROBERT P. HARBAGE.
EUGENE J. HAUPT.
BY
ATTORNEYS.

United States Patent Office 2,997,834
Patented Aug. 29, 1961

1

2,997,834
HAY CONDITIONER
Robert P. Harbage, Greenville, and Eugene J. Haupt, Celina, Ohio, assignors to Avco Manufacturing Corporation, New Idea Division, Coldwater, Ohio, a corporation of Delaware
Filed Mar. 30, 1959, Ser. No. 802,898
6 Claims. (Cl. 56—1)

This invention relates to a hay conditions and generally to a machine for crushing crop material such as hay, and more particularly to improvements in a machine which provides advantageous operating characteristics for cooperating crushing rolls to pick up and crush the crop material.

It is now quite a common practice to accomplish an advantage in drying time of the curing of hay by crushing the crop soon after cutting by a machine which picks up the swath and causes it to be carried between two cooperating rotating rolls. The satisfactory performance of these rolls during operation has been a question in certain prior art types of mechanisms, and the problems of stoppage or reduction in effectiveness of the cooperating rolls have resulted both because of a tendency of the material to wrap around one or the other of the rolls and failure to clear properly near the end of the roll and also to provide relatively less satisfactory drive conditions where projections or flutes on the roll extend continuously over the entire width thereof.

A major portion of these problems has been solved in the present invention by the provision of several features of construction—that is, the provision of one of the rolls with a structure employing staggered spaced vanes extending longitudinally and spaced circumferentially, thereby producing a roll having flutes relatively staggered between central and end portions of the roll; and further, that vanes on the portion of the roll toward the ends thereof are so constructed or spaced as to provide greater flute width between vanes at the end of the roll than in the central portion of the roll. Such structure affords greater aggressiveness with less wrapping and stoppage at the ends of the roll with only a slight sacrifice in crushing efficiency. Such result may be accomplished by tapering the vanes to a lesser width at the end than at the central portion, thus providing a wider flute or groove width at the end of the roll than at the center thereof. The combination of such a fluted roll with staggered and tapered or varied spacing of vanes to produce wider flutes or grooves at the ends of the roll operating with a rubber cooperating backing roll has been found to give major improvement in the results obtained.

Therefore, it is a primary object of the present invention to improve the operating characteristics of a hay-crushing or conditioning mechanism wherein the staggering and tapering or varied spacing of the vanes and flutes of a crushing roll is a primary feature of construction accomplishing advantageous improvements in operating characteristics.

The above and other objects of the invention will appear more fully from the following detailed description and by reference to the accompanying drawings, wherein:

FIGURE 2 is an enlarged perspective view of the two rolls with more detail of the relationship of the staggered and fluted portions of the lower roll;

FIGURE 3 is a section through the roll taken on the line 3—3 of FIGURE 2;

FIGURE 4 is an enlarged end view showing the drive mechanism and the relative position of the two rolls, the lower roll being at an angle of substantially 45° displaced from the vertical, as related to the upper roll; and FIGURE 5 is an enlarged rear view of the drive mechanism shown in FIGURE 4.

Figure 1:
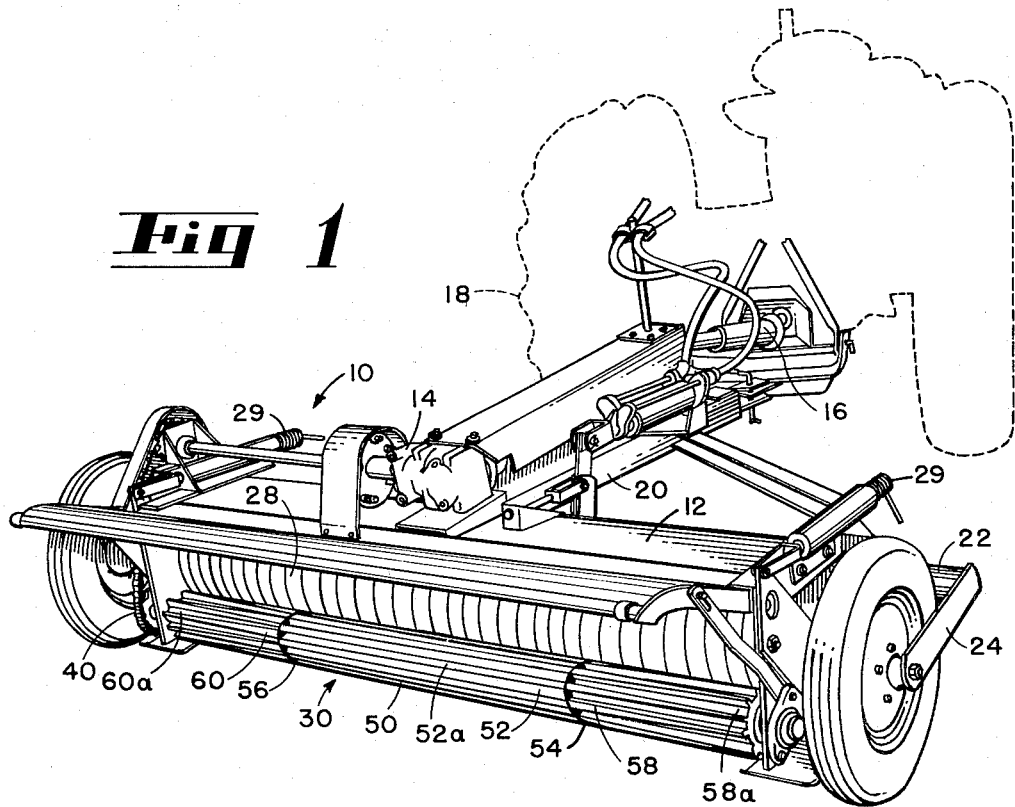
FIGURE 1 is a perspective view of the full assembly of the hay crushing and conditioning unit, showing the tapered and staggered fluted roll cooperating with an upper roll.

Referring to the drawings:

An illustrative embodiment of the crop pick-up and crushing machine employing the invention herein disclosed is made up of a crushing mechanim 10 carried by a draft frame 12 and power transmitting means 14 connected to the conventional power takeoff 16 from a tractor 18 shown in dotted lines on FIGURE 1. A drawbar secures the mechanism to the tractor 18.

As shown herein, the frame 12 comprises a wheel support axle 22 with end-bars 24 which support the crushing unit 10. The crushing unit is made up of an upper roll 28 which employs, in the illustrated mechanism, a covering of rubber-impregnated fabric disks or rubber tire carcass members which make up a relatively smooth rubber surface for the upper backing roll 28. The lower roll 30, which is of a fluted construction to be described in more detail, is positioned adjacent and in near surface contact with the roll 28 but with its axis of rotation at an angle of approximately 45° from the upper roll as shown in FIGURE 4. The two rolls are carried with extending shaft portions at their ends, the upper roll shaft 32 being shown in FIGURE 4 and the lower roll shaft 34 also being shown. The extending shaft 32 is provided with a driving sprocket 36 and the lower shaft is provided with a drive sprocket 38. The drive for the two rolls is provided from a chain 40 which is driven from a shaft 42 and a sprocket 44, the chain being carried over a tightener 46 to the previously mentioned sprockets 36 and 38 so that the rolls are rotated in the direction of the arrows shown in FIGURE 4. Thus, a movement of the mechanism along the ground toward the left, as shown in FIGURE 4, will pick up cut crop material from the ground and cause it to pass between and to be crushed between the upper and lower rotating rolls 28 and 30, the spring 29 providing resilience and affording a crushing force with necessary consideration for the thickness of the material passing between the rolls.

The structure of the lower roll 30 is an important feature of this invention, and it appears on inspection of FIGURES 1, 2 and 3 that the central portion 50 of the fluted roll has a series of vanes 52 as shown in FIGURES 1, 2 and 3, which in the central portion of the roll are substantially equally spaced circumferentially and do not taper in this central portion and form substantially equally spaced flutes 52a of uniform width between the vanes. However, it is shown particularly in FIGURES 1 and 2 that the two end portions of the roll have vanes 58, 60 which, beginning at a position such as 54, 56, are staggered relative to the vanes 52 of the center portion so that, beginning at the positions 54, 56 and extending toward the outer ends of the roll, the vanes 58, 60 are tapered to a narrower width toward the ends of the roll, and the flutes 58a, 60a between the vanes taper to a wider width toward the ends of the roll. The vanes and flutes therebetween are staggered the width of a vane at the position 54, 56, so that the vanes and flutes of the end portions are staggered circumferentially relative to the vanes and flutes of the center section and can be seen best in FIGURE 2.

Therefore, there is a combination of a lower roll rotating relatively opposite to an upper backing roll in a direction to pick up hay as the unit moves over the ground and to pass this hay for crushing between the two rotating rolls, the lower roll being offset backwardly from the upper roll so that the rotating axis of the lower roll, relative to the rotating axis of the upper roll (viewed in cross-section) is viewed in position backward from the upper roll in amount, in the mechanism here illustrated, approximately 45. The lower roll is fluted, staggered and tapered as above described while the upper roll presents a relatively smooth surface, preferably rubber, contacting the staggered, tapered, spaced vanes of the lower roll.

In operation, the staggering of the flutes of the roll makes the operation of the crushing mechanism much smoother because of the fact that only a portion of the vanes are in contact with the upper roll at the same time. With the staggered vane roll this permits the machine to be operated with approximately one-half the pressure between the rolls as compared with the pressure required for a full length uniform contact of vanes, assuming that either two 18-inch end sections or one 36-inch center section is in full vane contact at one time instead of the full effective roll length of 72 inches. The tapering of the vanes to lesser width toward the end of the roll affords wider flute width and additional aggressiveness toward the ends of the roll and has been found in practice to provide freedom from plugging on the ends of the roll. It was found that such greater flute width near the roll ends made the action more aggressive and solved the problem of the tendency of large bunches of hay to hang up on the ends of the roll while still retaining a sufficient crushing performance at the end of the roll.

The above-described mechanism has been found to be satisfactory in operation and to produce improved performance over mechanisms employing continuous and uniformly spaced fluted sections extending over the entire length of the lower roll, and has thus solved major difficulties.

While a specific embodiment of this invention has been shown and described, it is recognized that advantageous results may be obtained by variations and modifications in the structure, without departing from the principles herein disclosed. As an illustration, the wider flutes or grooves between the vanes at the end of the roll, as compared to the width of flutes at the center portion of the roll, might be accomplished by other means than by tapering of vane width without departing from the broad principles of the invention, and it is therefore intended that modifications are contemplated within the scope of the following claims.

What is claimed is:

1. A crop pickup and crushing machine comprising a frame and supporting ground wheels adapted to be drawn over a field of cut crop material, an upper backing roll rotatably mounted on the frame, a crop pickup roll also rotatably mounted on the frame and displaced downwardly and rearwardly from the upper backing roll but adjacent said backing roll to pick up and crush said crop material therebetween on rotation of said rolls, said pickup roll having circumferentially spaced vanes projecting radially from its peripheral face and spaced around the circumference of said pickup roll through a central longitudinal portion of said pickup roll, two end portions of said pickup roll also having spaced vanes similar to the center portion but staggered circumferentially relative to the center portion of said pickup roll and extending in tapered lesser circumferential width toward each end of said roll with resulting greater flute width between said last named vanes near the ends of said roll than the first named vanes in said central portion of said roll.

2. In a hay crushing mechanism of the character described employing a pair of adjacent counter-rotating upper and lower rolls for picking up and crushing cut crop material therebetween, spaced vanes on the central and end portions of said lower roll extending longitudinally of the lower of said rolls, said vanes on the central portion of said lower roll staggered circumferentially relative to vanes on the end portions, and said vanes on both end portions of said lower roll extending in tapered lesser circumferential width toward the ends of said roll thereby reducing the effective pressure between said rolls and varying the aggressiveness of the feeding action along the longitudinal length of said rolls.

3. In a crop pickup and crushing machine for crop material adapted for movement in a forward path of travel over the ground, the combination of two adjacent counter-rotating cylindrical upper and lower rolls with axes of rotation substantially parallel to each other and to the ground and with said axes substantially normal to the path of travel and with said lower roll offset rearwardly in the path of travel relative to the upper roll, the circumferential surface of said upper roll being substantially smooth and of resilient non-metallic material, projecting vanes on said lower roll circumferentially spaced to form recessed flutes therebetween, outer circumferential surfaces of said vanes rotating in adjacent crop material crushing position relative to said upper roll, the outer circumferential surfaces of vanes adjacent the respective end portions of said lower roll being offset circumferentially relative to like surfaces on said projecting vanes in the central portion of said roll, said offset being of such amount that the said outer circumferential surfaces of the vanes on the said end portions are in substantial alignment with said recessed flutes between the vanes in the central portion of said lower roll.

4. In a crop pickup and crushing machine for crop material adapted for movement in a forward path of travel over the ground, the combination of two adjacent counter-rotating cylindrical upper and lower rolls with axes of rotation substantially parallel to each other and to the ground and with said axes substantially normal to the path of travel and with said lower roll offset rearwardly in the path of travel relative to the upper roll, the circumferential surface of said upper roll being substantially smooth and of resilient non-metallic material, projecting vanes on said lower roll circumferentially spaced to form recessed flutes therebetween, outer circumferential surfaces of said vanes rotating in adjacent crop material crushing position relative to said upper roll, the outer circumferential surfaces of said projecting vanes adjacent the respective end portions of said lower roll being offset circumferentially relative to like surfaces on said projecting vanes in the central portion of said roll.

5. In a crop pickup and crushing machine for crop material adapted for movement in a forward path of travel over the ground, the combination of two adjacent counter-rotating cylindrical upper and lower rolls with axes of rotation substantially parallel to each other and to the ground and with said axes substantially normal to the path of travel and with said lower roll offset rearwardly in the path of travel relative to the upper roll, the circumferential surface of said upper roll being substantially smooth and of resilient non-metallic material, projecting vanes on said lower roll circumferentially spaced to form recessed flutes therebetween, outer circumferential surfaces of said vanes rotating in adjacent crop material crushing position relative to said upper roll, the circumferential width of said vanes progressively decreasing in circumferential width toward each respective end of said lower roll so that the flute width between said vanes increases over a region adjacent both ends of said roll.

6. In a crop pickup and crushing machine for crop material adapted for movement in a forward path of travel over the ground, the combination of two adjacent counter-rotating cylindrical upper and lower rolls with axes of rotation substantially parallel to each other and to the ground and with said axes substantially normal to the path of travel and with said lower roll offset rearwardly in the path of travel relative to the upper roll, the circumferential surface of said upper roll being substantially smooth and of resilient non-metallic material, projecting vanes on said lower roll circumferentially spaced to form recessed flutes therebetween, outer circumferential surfaces of said vanes rotating in adjacent crop material crushing position relative to said upper roll, the outer circumferential surfaces of said vanes adjacent the respective end portions of said lower roll being offset circumferentially relative to like surfaces on said projecting vanes in the central portion of said roll, the circumferential width of said vanes progressively decreasing in circumferential width toward each respective end of said lower roll so that the flute width between said vanes increases over a region adjacent both ends of said roll.

References Cited in the file of this patent

UNITED STATES PATENTS

| | | |
|---|---|---|
| 2,404,159 | Barber | July 16, 1946 |
| 2,731,782 | Mason | Jan. 24, 1956 |
| 2,753,788 | Getz | July 10, 1956 |

UNITED STATES PATENT OFFICE

CERTIFICATE OF CORRECTION

Patent No. 2,997,834                       August 29, 1961

Robert P. Harbage et al.

It is hereby certified that error appears in the above numbered patent requiring correction and that the said Letters Patent should read as corrected below.

Column 1, line 10, for "conditions" read -- conditioner --; column 2, line 8, for "mechanim" read -- mechanism --; column 3, line 1, for "45" read -- 45° --.

Signed and sealed this 13th day of February 1962.

(SEAL)
Attest:

ERNEST W. SWIDER
Attesting Officer

DAVID L. LADD
Commissioner of Patents